United States Patent [19]
Belart

[11] 3,836,207
[45] Sept. 17, 1974

[54] SEPARATING VALVE FOR AN ANTISKID BRAKE SYSTEM

[75] Inventor: Juan Belart, Walldorf, Germany

[73] Assignee: ITT Industries, Inc., New York, N.Y.

[22] Filed: Mar. 5, 1973

[21] Appl. No.: 338,016

[30] Foreign Application Priority Data
Apr. 15, 1972 Germany............................ 2218390

[52] U.S. Cl................ 303/21 F, 188/181 A, 303/61
[51] Int. Cl.............................................. B60t 8/06
[58] Field of Search...................... 303/21 F, 61–63, 303/68–69, 6 C; 188/181 A, 181 R

[56] References Cited
UNITED STATES PATENTS

| | | | |
|---|---|---|---|
| 3,466,098 | 9/1969 | Pieren et al. | 303/61 |
| 3,515,440 | 6/1970 | Every et al. | 188/181 A |
| 3,588,190 | 6/1971 | Nakano et al. | 188/181 A |
| 3,671,085 | 6/1972 | Pasek et al. | 303/21 F |
| 3,752,537 | 8/1973 | Ochiai | 303/21 F |

FOREIGN PATENTS OR APPLICATIONS

| | | | |
|---|---|---|---|
| 1,205,548 | 9/1970 | Great Britain | 303/21 F |

*Primary Examiner*—Trygve M. Blix
*Assistant Examiner*—D. C. Butler
*Attorney, Agent, or Firm*—John T. O'Halloran; Menotti J. Lombardi, Jr.; Alfred C. Hill

[57] ABSTRACT

This relates to a pressure actuated separating valve for an antiskid brake system employed in vehicles. The separating valve responds to a control signal indicating danger of a wheel locking condition to interrupt the connection between the master cylinder and a wheel brake cylinder. The separating valve reconnects this connection after the wheel locking danger is over. When the connection is to be reestablished, the master cylinder may have a pressure higher than the pressure in the wheel brake cylinder which if directly connected to the wheel brake cylinder would cause another wheel lock. This is overcome according to the present invention by providing an arrangement within the separating valve that will throttle the pressure rise in the wheel brake cylinder and thereby permit another operation of the antiskid system if necessary before full master cylinder pressure is present in the wheel brake cylinder.

12 Claims, 3 Drawing Figures

SEPARATING VALVE FOR AN ANTISKID BRAKE SYSTEM

BACKGROUND OF THE INVENTION

The invention relates to a pressure actuated separating valve for antiskid brake systems in vehicles and more particularly to such a separating valve which is dependent upon the movement of a plunger to influence the effective brake pressure in the wheel brake cylinders by a change of volume and to interrupt and reconnect the hydraulic connection between the brake actuating systems and the wheel brake cylinder.

It is known from the prior art, such as copending applications of H. von Grunberg et al., Ser. No. 282,532, filed Aug. 21, 1972; W. Fink et al., Ser. No. 290,293, filed Sept. 22, 1972 and F. Wienecke Ser. No. 300,620, filed Oct. 25, 1972, all of which are assigned to the assignee of the present invention and whose disclosure are incorporated herein by reference, to connect in that part of the brake line which should be disconnected from the brake actuating system a separating valve that is controlled by a cylinder of a plunger unit which in turn is controlled dependent upon the state of motion of the wheel or the wheels as determined by a sensor. The separating valve and plunger unit cooperate to provide expansion of the volume of the section of the brake medium line permanently connected with the wheel brake cylinders, i.e., the brake pressure is reduced, when the danger of a wheel locking condition is detected by the sensor. When the wheel locking danger has passed, this same volume will be reduced and the brake pressure is increased in the wheel brake cylinder. The separating valve, constructed in the shape of a seat valve, is placed in such a way between brake actuation system and wheel brake cylinder that, in rest position of the system the separating valve is held open against the brake pressure by means of the plunger of the plunger unit or an extension of the plunger unit and when it is relieved by the plunger moving in the sense of expansion of volume, the separating valve is closed by the brake pressure, until the separating valve is pushed open again under the return motion of the plunger. The devices working according to this principle have been constantly improved and refined. It has been determined that it is extremely damaging when, after the wheel locking danger is over, the brake pressure in the wheel brake cylinders is very suddenly increased to the former value or the value now present in the master cylinder. Thus, it has been found that after a rapidly effected volume increase, the reduction of volume has to be slowed down. This has been achieved by effecting a decelerated return movement of the plunger by throttling the pressure supply controlling the plunger unit and relief of the control pressure.

Apparently, however, it has not been realized that a sudden increase of the brake pressure in the wheel brake cylinders might not only be a result of a too rapid return movement of the plunger, but is also the result of opening the separating valve completely after the decelerated return movement of the plunger unit.

This problem is illustrated in FIG. 1. Line 1 illustrates the gradually rising brake pressure when the brake pedal is pushed. In point A the antiskid sensor of the respective wheel should signal a wheel locking danger and the final control element (correcting element) should be actuated to achieve a pressure reduction (line 2). After the pressure has been held at a low value for a short period of time, the brake pressure is increased at a slower rate by the slow return motion of the plunger unit and reaches, just before the separating valve is pushed open, the former value at point B. In the meantime, however, the pressure in that section of the brake line between brake actuating system and separating valve has continued to rise because, for instance, the driver might, in a panic reaction, step on the brake pedal with full force. Now, in pushing open a separating valve constructed as a normal seat valve, the brake pressure in the wheel brake cylinders would suddenly rise from point B to the value at point C as indicated by the broken line 3. The sensor and control element could not properly respond during this short time and the wheels would consequently lock.

SUMMARY OF THE INVENTION

It is an object of the present invention to eliminate this disadvantage and to provide a construction of plunger and separating valve which guarantees an ultimate evenly controlled reactuation of the brake shoes so that a proper response of the sensor and control element in a given period of time is possible.

According to this invention this is achieved by disposing in the valve casing concentrically to each other a first valve closing element controlling the free flow of the pressure medium from the master cylinder to the wheel brake cylinders and a second valve closing element controlling a throttled pressure medium flow, so that the first valve closing element can only be actuated in an opening direction when the second valve closing element is also actuated in an opening direction. The second valve closing element and the first valve closing element are consecutively mechanically actuated in an opening direction while in a closing direction they are actuated in a joint mechanical and hydraulic manner.

A feature of the present invention is the provision of a pressure actuated separating valve for an antiskid brake system, the separating valve interrupting and reestablishing a pressure medium connection between a brake actuating means and at least one wheel brake cylinder in response to movement of a plunger unit whose movement is responsive to antiskid control signals, comprising: a valve casing having a first longitudinal bore coaxial of a longitudinal axis; a first valve closing element disposed concentric of the first bore to control a free pressure medium flow from the brake actuating means to the wheel brake cylinder; and a second valve closing element disposed within and concentric of the first valve closing element to control a throttled pressure medium flow from the brake actuating means to the wheel brake cylinder; the first valve closing element being actuated in its opening direction only after the second valve closing element has been actuated in its opening direction.

Another feature of the present invention is that the second valve closing element is ball shaped.

Still another feature of the present invention is that the first valve closing element, the valve seat of which is a step of the inner surface of the valve casing bore, includes an axial bore enlargening by means of steps spaced from the valve seat, through which a ram, operable by the plunger, is projecting for actuation of the second valve closing element, the valve seat of which is positioned on a ring edge formed by the gradual enlargement of the axial bore in the first valve closing element.

A further feature of the present invention is that the second valve closing element is prestressed by a spring in the closing direction.

Still a further feature of the present invention is that in one embodiment of the invention the first valve closing element is prestressed by means of a spring in the opening direction, the spring, on one hand, being supported by a collar of the ram and, on the other hand, on a ring surface which surrounds the bore of the first valve closing element.

Another feature of the present invention is that the tension of the spring actuating the first valve closing element in the opening direction is greater than the maximum brake pressure applied to the effective actuating surface of this valve closing element in the opened position.

Still another feature of the present invention is the provision of a cap, which includes compensating openings, overlapping both valve closing elements with the spring prestressing both valve closing elements in the closing direction being supported at one end by an outside step of the cap and at the other end by a stop ring in the valve case bore.

A further feature of the present invention is that in another embodiment of the invention the first valve closing element is constructed to have a hemispherical shape followed by a step and then a hollow cylinder, the hollow cylinder having two step integrated into the inner surface thereof so that the second step serves as the valve seat for the second valve closing element.

Still a further feature of the present invention is that the second valve closing element is prestressed in the closing direction by a spring disposed in a pot-shaped element with compensation openings therein disposed on the inside of the hollow cylinder, the spring supporting itself on the bottom of the hollow cylinder which is provided with compensating openings.

Another feature of the present invention is that the first valve closing element is prestressed in the closing direction by means of a spring within a jacket disposed in the valve case bore. This spring has one end thereof supported on the bottom of the valve case and the other end thereof supported by a radially inward extending collar of the jacket which rests on the step on the outer surface of the first valve closing element. The jacket and collar thereof are interconnected by a bevelled portion including compensating bores therein.

Still another feature of the present invention is that the spring prestressing the second valve closing element in the closing direction is considerably stronger than the spring prestressing the first valve closing element in the closing direction.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 2:
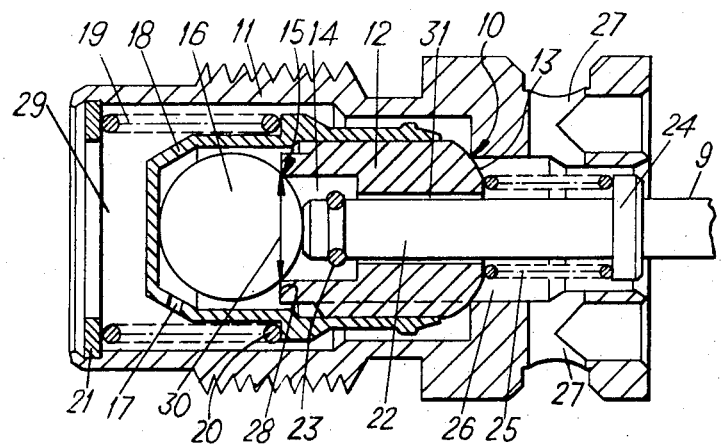
FIG. 2 is a longitudinal cross sectional view of one embodiment of a separating valve according to the principles of the present invention.

FIG. 2 illustrates a longitudinal cross sectional view of one embodiment of the separating valve according to the present invention. A hollow-cylindrical valve casing 11 includes a radially inward extending collar or step serving as seat 10 for a cylindrical first valve closing element 12 the closing surface of which is, as is known, constructed in conical shape 13. Valve closing element 12 includes a coaxial bore having an enlargened recess 14. The ring edge of this recess 14 serving as the valve seat 15 for a second valve closing element 16 having a ball shape. A cap 18 which is provided with compensating bores 17 overlaps ball shaped closing element 16 as well as first valve closing element 12. Cap 18 is slidingly fitted against the outer surface of element 12. A spring 19 supports itself at one end on a step 20 in the outer circumference of cap 18 and at the other end on a stop ring 21 disposed transverse of valve casing 11. Spring 19 serves to keep cap 18 in place. A ram 22 projects through the axial bore of valve closing element 12 with play and serves to actuate ball 16. On the end of ram 22 which projects into recess 14 of valve closing element 12, a circular clip 23 is provided which prevents ram 22 from sliding out. The other end of ram 22 is formed into a collar 24. A pressure spring 25 has one end thereof supported on collar 24 and the other end thereof is supported on the ring surface 26 surrounding the axial bore of valve closing element 12.

When the separating valve is built into the brake system valve casing 11 is connected at one end thereof (the end adjacent supply line 29) with the brake actuation system in such a way that the brake pressure to be built up actuates valve closing element 12 and ball 16 in a closing direction. The other end of casing 11 is connected to the plunger 9 of the plunger unit (not shown) so that ram 22 is operated by the plunger unit.

A lateral bore 27 in valve casing 11 serves as the connection bore to the wheel brake cylinders.

In the operation of the system plunger 9 is pushed against collar 24 of ram 22. Ram 22 actuates ball 16 and cap 18 and lifts ball 16 from its valve seat 15. Then valve closing element 12 is lifted off its seat 10 by spring 25 and valve seat 15 is again pressed against ball 16. Spring 25 is dimensioned in such a way that the value of its tension exceeds the maximum power resulting from the brake pressure building up when the brakes are applied. This pressure is applied to the pressure-actuating surface 28 of valve closing element 12. At this stage of operation free pressure medium flow is provided through supply line 29 from the master cylinder, the ring shaped space between the inner wall of valve casing 11 and the outer wall of cap 18, the opened valve 10, 12, the space 26 and the lateral bore 27 to the wheel brake cylinders. Thus, the driver can build up brake pressure as illustrated in line 1, FIG. 1.

Through compensating bores 17 in cap 18 the brake pressure is also applied to the pressure-actuating surface 28 of valve closing element 12 and ball 16. However, this pressure cannot move element 12 against the tension of spring 25 and the force bearing against ball 16 is mechanically eliminated by ram 22.

Figure 1:
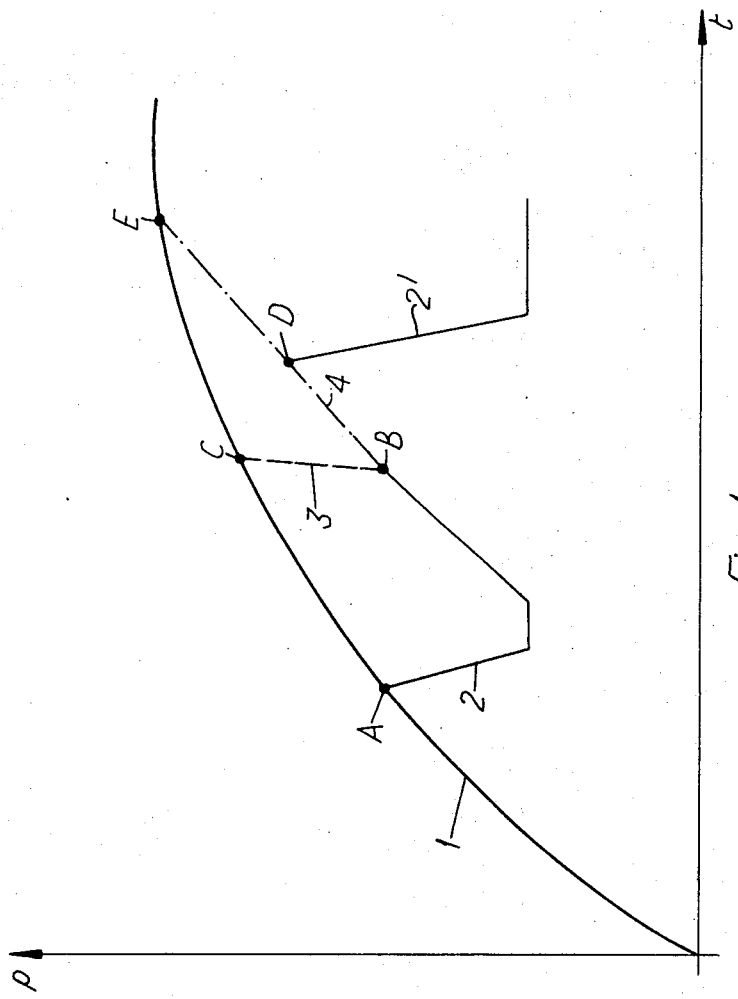
FIG. 1 illustrates curves of the brake pressure useful in describing the disadvantage of the prior art and the advantages of the present invention.

At point A of line 1, FIG. 1 the sensor of a wheel might, as mentioned before, signal a wheel locking danger. By means of control signals the plunger unit and, hence, plunger 9 is induced to carry out a movement enlargening the space in the plunger unit connected with lateral bore 27. Plunger 9 is then moved away from collar 24 of ram 22. The tension of spring 25 can now be exceeded by the brake pressure which is applied to the pressure-actuating surface 28 of valve closing element 12 and the cross-sectional area 30 of ball 16, and the separating valve closes. Thus, the connection between the master cylinder and the wheel brake cylinders is interrupted and the movement of the plunger unit is effecting a pressure decrease in that section of the brake line which is connected with the wheel brake cylinders (line 2, FIG. 1). Preferably the brake pressure is held constant at an intermediate value subject to time or subject to new control signals. By means of the sensor on the wheel it can also be determined when the state of motion of the wheel has recovered and by a controlled return movement of the plunger unit the pressure in the wheel brake cylinders is increased. Preferably the return movement of the plunger is carried out in a decelerated way in constrast to its first movement, so that the pressure is slowly increased to its original value (point B, FIG. 1) and a renewed wheel locking will not be caused again. The driver has in the meantime continued to increase the pedal brake pressure, so that in that part of the brake line which is connected with the master cylinder the brake pressure has continued to rise according to line 1, FIG. 1. In addition, the exterior driving conditions, such as the road condition, might have improved so that the pressure in the wheel brake cylinders might indeed rise to that value at which the control element has responded for the first time and even beyond it, without locking of the wheels. Just before reaching its starting position, plunger 9 is pushing against collar 24 of ram 22 and is lifting ball 16 off its seat 15 against the pressure built up in the master cylinder (point B, FIG. 1) while valve closing element 12 actuated by the master cylinder pressure remains closed. The master cylinder pressure can now expand in a decelerated way through compensating bores 17 of cap 18, the opened seat valve 16, 15, the gap 31 between ram 22 and valve closing element 12 up to that section of the brake line which is connected with the wheel brake cylinders and the effective brake pressure rises in a decelerated way as illustrated by the chain dotted line 4 in FIG. 1. During this pressure rise a new pressure value (point D, FIG. 1) can be reached at which a sensor is signalling a wheel locking danger. Since, according to the invention, the pressure rise is effected in a decelerated way, the control element can again respond (line 2', FIG. 1) before the pressure in the wheel brake cylinders has risen to the master cylinder pressure at point E, FIG. 1 where the wheels may really lock. When the pressure on both sides of valve closing element 12 has been balanced or when the act of braking has been completed, pressure spring 25 again opens seat valve 10, 12.

Figure 3:
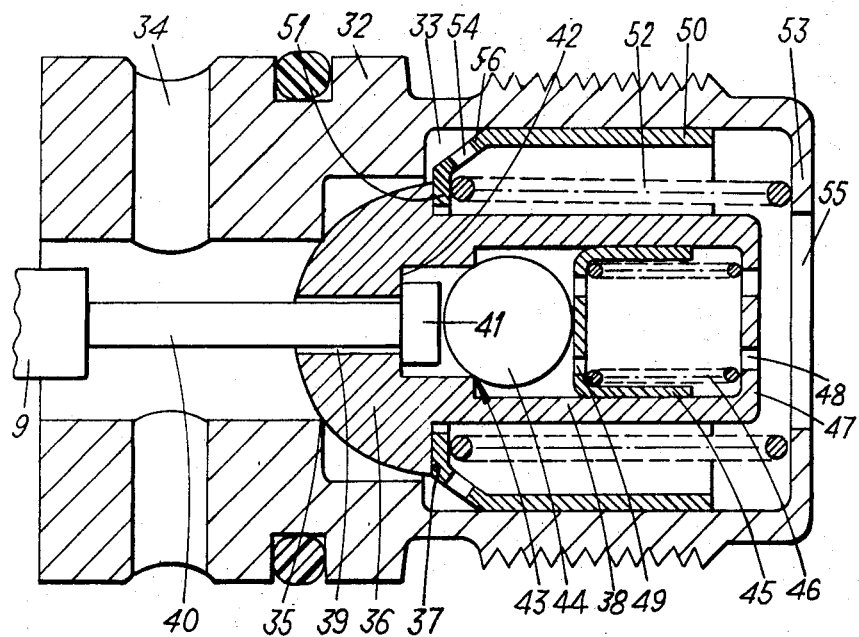
FIG. 3 is a longitudinal cross sectional view of another embodiment of a separating valve according to the principles of the present invention.

FIG. 3 illustrates a longitudinal cross sectional view of another embodiment of the separating valve in accordance with the principles of the present invention. The valve casing 32 has a double stepped cylindrical recess or coaxial bore 33 which is crossed in its narrower section by a lateral bore 34 for the connection to the wheel brake cylinders. The narrow step serves as a seat 35 for a hemispherically shaped valve closing element 36 which is spaced sufficiently from the surrounding inner wall of casing 32. Closing element 36 is also formed to provide a hollow cylinder 38 by means of a step 37 on its end remote from seat 35. The hemispherical valve closing element 36 is provided with a center bore 39, which, by means of two steps, is integrated into the space of the hollow cylinder 38. A ram 40 projects with clearance through the center bore 39. Ram 40 includes a collar 41 which rests on the first step 42. The second step serves as valve seat 43 for a ball 44. A pot-shaped part 45, which is placed with its shell surface in contact with the inner surface of cylinder 38, is pushed against ball 44 by means of a spring 46 which supports itself on the bottom 47 of hollow cylinder 38. The bottom 47 of hollow cylinder 38, as well as the pot-shaped part 45 which is pushed against ball 44, are provided with compensating openings 48 and 49. Concentric with hollow cylinder 38 a jacket 50 is disposed in cylindrical recess 33 of the valve casing 32. Jacket 50 is disposed in contact with the inner wall of the valve casing 32 and one end thereof includes a bevelled portion 56 and a radial inwardly extending collar 51. Collar 51 is held in position and in contact with step 37 at the transition of hemispherical valve closing element 36 and hollow cylinder 38 by means of a spring 52 which is weaker in comparison with spring 46, spring 52 supporting itself on the bottom 53 of valve casing 32.

Compensating openings 54 are provided in the bevelled portion 56. In bottom 53 of valve casing 32 an opening 55 is provided through which the valve is connected with the master cylinder of the brake system. The end of ram 40 remote from seat 35 is in cooperative relationship with plunger 9 of the plunger unit (not shown).

The operation of this embodiment of the inventive separating valve will now be described. Plunger 9 is adjusted to contact ram 40 in such a way that ram 40 lifts ball 44 of its seat 43 against the tension of spring 46. Since spring 52 operating on hemispherically-shaped valve closing element 36 is considerably weaker than spring 46, hemispherically-shaped valve closing element 36 is also lifted off its seat 35 via ball 44, pot-shaped part 45 and spring 46 to establish a connection between the master cylinder connection 55 and the wheel brake cylinders so that the driver, by actuating the brake pedal, can initiate a braking action whereby the brake pressure increases according to line 1, FIG. 1. Again at point A by means of antiskid control signals, the plunger unit will be actuated to carry out a movement enlargening that section thereof which is connected with the wheel brake cylinders to decrease the pressure in the wheel brake cylinders and to also cause plunger 9 to move away from ram 40. Primarily the pressure being built up by the master cylinder, but assisted by springs 46 and 52, actuate both valve closing elements 36 and 44 to press them against their valve seats 35 and 44 so that the connection between the master cylinder and the wheel brake cylinders is interrupted. After keeping the brake pressure constant at an intermediate value for a certain time, the pressure in the wheel brake cylinders is increased again to the former value at point B in FIG. 1 by the slow return movement of the plunger unit. Plunger 9 then presses against ram 40 and thus lifts ball 44 off its seat valve 43, while the pressure, which is continuously increased by the master cylinder, is applied to the hemispherical valve closing element 36 and keeps it closed against the tension of spring 46.

The master cylinder pressure can build up in the wheel brake cylinders in a decelerated manner by means of the compensating openings 48 and 49, the opened valve 44, 43 and the gap between ram 40 and the valve closing element 36 according to the dash-dotted line 4 in FIG. 1. When the hemispherical valve closing element 36 is almost pressure-balanced, it is lifted off its seat 35 by means of the tension of spring 46. During the decelerated pressure build-up in the wheel brake cylinders the sensor can, should a new wheel locking danger arise, respond again, so that the locking of the wheels will as a matter of fact be prevented.

The sudden pressure rise in the wheel brake cylinders according to the dash-line 3 in FIG. 1 which takes place in such a short time that during this period the sensor cannot respond is avoided by the separating valves according to the present invention. By proper dimensioning of the various components of the separating valves of this invention, there can be provided a pressure rise in the wheel brake cylinder during the decelerated return movement of the plunger and after opening of the throttling valve that has an almost constant slope.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pressure actuated separating valve for an antiskid brake system, said separating valve interrupting and reestablishing a pressure medium connection between a brake actuating means and at least one wheel brake cylinder in response to movement of a plunger unit whose movement is responsive to antiskid control signals, comprising:
    a valve casing having a first longitudinal bore coaxial of a longitudinal axis;
    a first valve closing element disposed concentric of said first bore to control a free pressure medium flow from said brake actuating means to said wheel brake cylinder;
    a second valve closing element disposed within and concentric of said first valve closing element to control a throttled pressure medium flow from said brake actuating means to said wheel brake cylinder;
    a first spring means disposed coaxial of said axis in a cooperative operating association with said first valve closing element;
    a second spring means disposed coaxial of said axis in a cooperative operating association with said second valve closing element; and
    a ram means disposed coaxial of said axis operable by said plunger unit, said ram being in a cooperative operating association with said second valve closing element;
    said first and second spring means and said ram means being in a cooperative operating association with each other to cause said first valve closing element to be actuated in its opening direction only after said second valve closing element has been actuated in its opening direction.

2. A separating valve according to claim 1, wherein said first and second springs and said ram are in a cooperative operating association with each other such that said second valve closing element and said first valve closing element are mechanically actuated one after the other in their opening direction and both said first and second valve closing elements are actuated together hydraulically in their closing direction.

3. A separating valve according to claim 2, wherein said second valve closing element has a ball shape.

4. A separating valve according to claim 3, further including
    a radial inwardly extending first step disposed in the inner surface of said first bore to provide a first valve seat for said first valve closing element;
    a second longitudinal bore coaxial of said axis disposed in said first valve closing element, said second bore having a first portion with a given diameter adjacent said first valve seat and a second portion with a first diameter greater than said given diameter spaced from said first valve seat, adjacent ends of said first and second portions being interconnected by a second step in the inner surface of said second bore, the end of said second portion remote from said second step providing a second valve seat for said second valve closing element; and
    said ram projects through said first portion into said second portion to actuate said second valve closing element.

5. A separating valve according to claim 4, further including
    a first spring to prestress said second valve closing element in its closing direction.

6. A pressure actuated separating valve for an antiskid brake system, said separating valve interrupting and reestablishing a pressure medium connection between a brake actuating means and at least one wheel brake cylinder in response to movement of a plunger unit whose movement is responsive to antiskid control signals, comprising:
    a valve casing having a first longitudinal bore coaxial of a longitudinal axis;
    a first valve closing element disposed concentric of said first fore to control a free pressure medium flow from said brake actuating means to said wheel brake cylinder;
    a second valve closing element disposed within and concentric of said first valve closing element to control a throttled pressure medium flow from said brake actuating means to said wheel brake cylinder;
    said first valve closing element being actuated in its opening direction only after said second valve closing element has been actuated in its opening direction and both said first and second valve closing elements being actuated together hydraulically in their closing direction;
    said second valve closing element having a ball shape;
    a radial inwardly extending first step disposed in the inner surface of said first bore to provide a first valve seat for said first valve closing element;

a second longitudinal bore coaxial of said axis disposed in said first valve closing element, said second bore having a first portion with a given diameter adjacent said first valve seat and a second portion with a first diameter greater than said given diameter spaced from said first valve seat, adjacent ends of said first and second portions being interconnected by a second step in the inner surface of said second bore, the end of said second portion remote from said second step providing a second valve seat for said second valve closing element;

a ram operable by said plunger unit projecting through said first portion into said second portion to actuate said second valve closing element;

a first spring to prestress said second valve closing element in its closing direction;

a collar disposed on the end of said ram adjacent said plunger unit; and a second spring disposed coaxial of said ram extending between said collar and the end of said first valve closing element surrounding said first portion adjacent said first valve seat to prestress said first valve closing element in its opening direction.

7. A separating valve according to claim 6, wherein said first valve closing element includes
a pressure actuating surface disposed transversely of said axis adjacent said second valve seat; and the value of the tension of said second spring is greater than the force of the maximum brake pressure applied from said braking actuating means to said pressure actuating surface when said first valve closing element is in its opened position.

8. A separating valve according to claim 7, further including
a cap having pressure medium openings therein, said cap being disposed to encircle both said first and second valve closing elements and having a radial outwardly extending third step disposed in the outer surface thereof; and
a stop ring disposed transversely of said first bore adjacent the end thereof remote from said ram; and wherein
said first spring is supported between said stop ring and said third step to prestress both said first and second valve closing elements in their closing direction.

9. A pressure actuated separating valve for an antiskid brake system, said separating valve interrupting and reestablishing a pressure medium connection between a brake actuating means and at least one wheel brake cylinder in response to movement of a plunger unit whose movement is responsive to antiskid control signals, comprising:
a valve casing having a first longitudinal bore coaxial of a longitudinal axis;
a first valve closing element disposed concentric of said first bore to control a free pressure medium flow from said brake actuating means to said wheel brake cylinder;
a second valve closing element disposed within and concentric of said first valve closing element to control a throttled pressure medium flow from said brake actuating means to said wheel brake cylinder;

said first valve closing element being actuated in its opening direction only after said second valve closing element has been actuated in its opening direction and both said first and second valve closing elements being actuated together hydraulically in their closing direction;

said second valve closing element having a ball shape;

a radial inwardly extending first step disposed in the inner surface of said first bore to provide a first valve seat for said first valve closing element;

a second longitudinal bore coaxial of said axis disposed in said first valve closing element, said second bore having a first portion with a given diameter adjacent said first valve seat and a second portion with a first diameter greater than said given diameter spaced from said first valve seat, adjacent ends of said first and second portions being interconnected by a second step in the inner surface of said second bore, the end of said second portion remote from said second step providing a second valve seat for said second valve closing element;

a ram operable by said plunger unit projecting through said first portion into said second portion to actuate said second valve closing element;

said first valve closing element including
a first section having a hemispherical shape for cooperation with said first valve seat to control the free pressure medium flow from said brake actuating means to said wheel brake cylinder,
a second section in the form of a hollow cylinder, said second section being interconnected to said first section by a radial inwardly extending third step in the outer surface of said first valve closing element, and
said first and second sections include said second bore, said second portion of said second bore further includes in said second section a third portion having a second diameter greater than said first diameter, adjacent ends of said second and third portions being interconnected by a fourth step,
said fourth step providing said second valve seat.

10. A separating valve according to claim 9, further including
a bottom wall for said second section spaced from said fourth step and transverse to said axis;
first compensating bores disposed in said bottom wall;
a pot-shaped part having its outer cylindrical wall disposed in sliding relation with the inner surface of said second section and its bottom in contact with said second valve closing element;
second compensating bores disposed in said bottom of said pot-shaped part; and
a first spring disposed within said pot-shaped part between said bottom wall and said bottom of said pot-shaped part to prestress said second valve closing element in its closing direction.

11. A separating valve according to claim 10, further including
a radial inwardly extending first collar for said valve casing adjacent said second section;
a jacket having
a cylindrical portion, the outer surface of said cylindrical portion being in a sliding relation with the inner surface of said first bore adjacent said first collar, a radial inwardly extending second collar engaging said third step, and a bevelled portion interconnecting said cylindrical portion and said second collar;

third compensating bores disposed in said bevelled portion; and a second spring disposed concentric with the outer surface of said second section supported between said first and second collars to prestress said first valve closing element in its closing direction.

12. A separating valve according to claim 11, wherein said first spring is considerably stronger than said second spring.

* * * * *